United States Patent [19]
Gerber

[11] Patent Number: 5,877,969
[45] Date of Patent: Mar. 2, 1999

[54] SYSTEM AND METHOD FOR PREVENTING AUTO THEFTS FROM PARKING AREAS

[76] Inventor: Eliot S. Gerber, 9 Frog Rock Rd., Armonk, N.Y. 10504

[21] Appl. No.: 797,985

[22] Filed: Feb. 12, 1997

Related U.S. Application Data

[60] Division of Ser. No. 607,125, Feb. 26, 1996, Pat. No. 5,638,302, which is a continuation-in-part of Ser. No. 566,145, Dec. 1, 1995, Pat. No. 5,568,406.

[51] Int. Cl.$^6$ ........................................................ G08G 1/01
[52] U.S. Cl. .......................... 364/562; 364/563; 340/933; 116/33; 194/302
[58] Field of Search ..................................... 364/550, 556, 364/562, 563, 565, 436; 340/933–937; 194/902, 302; 116/33

[56] References Cited

U.S. PATENT DOCUMENTS

| | | | |
|---|---|---|---|
| 4,368,979 | 1/1983 | Ruell | 356/71 |
| 4,603,390 | 7/1986 | Mehdipour et al. | 364/467 |
| 4,774,571 | 9/1988 | Mehdipour et al. | 358/108 |
| 4,958,064 | 9/1990 | Kirkpatrick | 235/384 |
| 4,990,757 | 2/1991 | Edwards et al. | 235/384 |
| 5,082,365 | 1/1992 | Kuzmick et al. | 356/28 |
| 5,083,200 | 1/1992 | Deffontaines | 358/105 |
| 5,422,473 | 6/1995 | Kamata | 235/384 |

Primary Examiner—James P. Trammell
Assistant Examiner—Craig Steven Miller
Attorney, Agent, or Firm—Eliot S. Gerber

[57] ABSTRACT

A method and system to prevent auto theft from parking areas, such as airport parking lots, includes a ticket dispenser, at an entry gate, which issues a numbered ticket to each driver. The driver is advised to carry the ticket with him and not to leave it in the car. At the same time the ticket is issued, the a part of its license plate number, is automatically determined and entered into computer memory, in association with the ticket number. At the exit, the ticket is presented by the driver, read by a ticket reader, and its associated license plate data is retrieved from computer memory. Also at the exit, part of the license plate of the car is again automatically obtained and compared with the license plate data retrieved from the computer memory. In the event of a mismatch, a warning signal is generated.

12 Claims, 5 Drawing Sheets

SYSTEM AND METHOD FOR PREVENTING AUTO THEFTS FROM PARKING AREAS

This application is a division of application Ser. No. 08/607,125, filed Feb. 26, 1996, now U.S. Pat. No. 5,638, 302, which was a continuation-in-part application partly based upon application Ser. No. 08/566,145 filed Dec. 1, 1995, now U.S. Pat. No. 5,568,406, issued Oct. 22, 1996.

FIELD OF THE INVENTION

The present invention relates to the prevention of car theft and more particularly to the prevention of cars being stolen from a parking area.

BACKGROUND OF THE INVENTION

At the present time the theft of automobiles (cars) from parking areas is an important problem. "Parking areas" include shopping malls, parking lots and other outdoor and indoor parking areas, indoor parking garages, airport parking lots and other paid and unpaid car parking facilities, gated communities (private communities) as well as military bases and other facilities where cars are parked.

Despite the best efforts of auto manufacturers, car theft device manufacturers and the police, car theft from parking areas remains as one of the most prevalent crimes, resulting in the loss of billions of dollars and high car theft insurance rates in many areas. In addition, customers may fear leaving their cars in shopping malls, and other parking lots, resulting in a loss of business to such malls.

Car manufacturers now produce cars with various anti-theft devices, such as locked steering wheels, keys with microprocessor chips, and remote control locks. In addition, various steering wheel locks and bars are widely used. Another anti-theft system uses a radio transmitter hidden in the car which is activated when the car is reported as being stolen. Despite these devices, car theft from parking areas is still a problem. For example, *The New York Times*, Feb. 6, 1996, pages B1, B4, reports that at the Green Acres shopping mall in Valley Stream, Long Island, N.Y., as a result of increased security, the number of cars stolen from that mall fell from 532 cars in 1984 to 159 cars in 1995, still an unacceptably large number.

When a car is stolen it may be reported to the police almost immediately. However, by that time it may be out of the parking area and on its way, for example, to be disassembled in a "chop shop" or shipped abroad. The police would be notified of the car's description, i.e., "a white 1995 Acura Legend four-door" and its license number, i.e., New York "JWB 123". However, the thief, to prevent being caught, may immediately, before he exits the parking area, switch the original license plates with license plates he has brought with him. Consequently, the police would not be able to detect and stop the stolen car even if they are present at the exit of the parking area when the thief drives out with the stolen car.

The issued U.S. Patents mentioned below are incorporated by reference. U.S. Pat. No. 4,947,353 uses a scanning laser, which scans at 160 times per second, on one side of a roadway, and a vertical elongated photoelectric detector on the other side, to measure the heights of vehicles. U.S. Pat. No. 5,088,827 discloses a system for measuring the width of a traveling object, such as a wire, being manufactured. U.S. Pat. No. 5,083,200 relates to using a linear camera for obtaining the silhouette of a traveling vehicle to determine if it is a truck etc., using its length and height. U.S. Pat. No. 5,381,155 uses a license plate reader, a speed measuring device, a data base of registered vehicles and a variable message sign to display the names of speeding drivers on the sign. In U.S. Pat. No. 5,066,950 two spaced-apart infra-red beams are used to indicate the speed, length and separation of traveling vehicles for photographing speeding vehicles.

The following U.S. patents relate to reading license plates and generating digital signals representing the plate numbers: U.S. Pat. Nos. 4,567,609; 4,817,166; 5,081,685; 5,136, 658; 5,175,617; 5,204,573; 5,204,675; 4,731,854; 4,878, 248; 5,315,664; 5,425,018.

SUMMARY OF THE INVENTION

In accordance with the present invention there is provided a system and method to identify cars which have been stolen as they exit a parking area. The system operates on all cars without any modification, addition or device on the cars.

A basis of the system and method is that a ticket is issued at the entry barrier gate of the parking area, the driver keeps the ticket with him while shopping, visiting, etc., and the ticket is presented at the exit barrier gate. The ticket is associated with the car, for example, by license plate number and a physical characteristic of the car, preferably length, color and lens shape (headlight and/or rear light).

If a thief steals a car, he would not have the ticket which matches the car. A thief may drive a junk car into the parking area and would obtain a ticket, but the ticket would not match a car he steals and seeks to exit with. Preferably the tickets are numbered so that even if a thief counterfeited a ticket its number would not match the physical characteristics or license plate of the car he steals. The thief cannot steal a car and switch plates, even of the same color and model car, as he would not have a ticket having a matching plate number. And a thief cannot simply drive away a stolen car, as he would not have the required matching ticket.

Television cameras (electro-optical sensors) are mounted at the entry and exit of the parking area to read license plate numbers. One set of selected camera locations are on the poles on the sides of the parking area entry or exit road, or on overhead support structures spanning such a roadway, or on light fixtures or stop lights which extend over the roadway.

The camera is preferably an automatically turnable camera of the speed-variant type, producing an image of less than 40,000 pixels. The camera is connected to a digital computer, preferably a special computer ("processor board") having fast digital processing chips (DPC) which has been programmed by software. The computer performs two functions. First, it "reads" the license plate number, preferably by a template matching system. Secondly, it may also be used, optionally, to help identify the car's model and color, again preferably by a template matching system which relies primarily upon the shape and spacing of the car's headlights and rear lights.

The preferred physical characteristics of the "target car" (the car entering or leaving the parking area) are its color, length and width. The length and possibly the width is measured. If a target car's measured length is not the same as the length retrieved from the ticket, or computer system memory (data base), it may be a switched ticket or counterfeit ticket and the car may be stolen. A warning signal is generated so that an exit gate is not raised and so that the target car may be stopped by a police officer.

The preferred system to measure car length employs a laser rangefinder pointed at the front of the car and a second laser rangefinder pointed at the back of the car, when the car halts, at the entry, for the driver to reach for a ticket. The length of the car is calculated, by a computer system, from the results obtained from the two rangefinders.

A less preferred system to determine a car's length uses a series of, for example 250 photoresponsive sensors in a line, spaced one inch apart. The car's length is measured by how many of the sensors are affected by the car.

Another system to determine the car's length consists of two spaced, or angled, light beams, for example, laser or infra-red beams. The car's speed is determined by the time that elapses from the front of the car interrupting the first light beam until the front of the car interrupts the second light beam. The length of the car is automatically derived from the computer, from the length of time each beam is interrupted by the car, combined with that car's speed.

Although one embodiment uses a license plate reader (LPR) the system and method may be implemented using only the physical characteristics of cars, including length, width, color and lens array. The system, without an LPR, would detect almost all stolen cars. In this case a ticket is associated with, for example, car length and color. In almost all cases this is sufficient to identify a car. However, a car will occasionally have an object protruding from its trunk, for example, which the owner bought in the mall, so the length will not be the same at entry and at exit. In that case the driver may be asked for identification. In addition, the color would not be an accurate guide if it is snowing; in which case the color reader may be shut off.

The "characteristics" of a vehicle include its license plate number, length, width, color and shape, especially the shape of its front and rear lenses.

The system, in the event of a mismatch (the ticket does not match the characteristics of the car) generates a "warning signal". For example, the warning signal causes the exit barrier gate not to lift. The warning signal may also be a bell or buzzer which is sounded, or a display which is illuminated, at a gate house, office or security force vehicle.

If a customer loses his ticket, or the computer system indicates that the ticket which is presented does not match the car, the driver would be asked for identification. Preferably the required identification would be the car's registration, having its license plate number and owner, and a "photo ID" (photograph identification). Such identification may be shown to a guard at the exit gate, to personnel at an office, or placed on a surface under a TV camera connected to a monitor at a facility office. The guard, or office, may lift the exit barrier gate by a signal to that gate.

The duplication of two ways to identify a car, for example, the license plate number and car length, is to avoid "false positives" in which a car is incorrectly identified as being stolen. If only license plates are used, with presently available technology, at best 1 out of 100 cars would be incorrectly identified as stolen (ticket not match partial license plate number). It is preferred that a car be considered not stolen if either the partial license plate number or the length detected at the exit gate match the ticket. Using that alternative matching, it is believed that less than 1 out of 10,000 cars would be incorrectly identified as stolen and its driver asked for identification.

This system and method does not require an attendant at the exit. If there is an attendant, it does not require his diligence or attention in the identification of cars. Any system that would require an attendant to identify cars would be unreliable as he may be inattentive or busy.

BRIEF DESCRIPTION OF THE DRAWINGS

Other objectives and features of the present invention will be apparent from the following detailed description of the invention, taken in conjunction with the accompanying drawings. In the drawings.

DETAILED DESCRIPTION

Figure 1A:
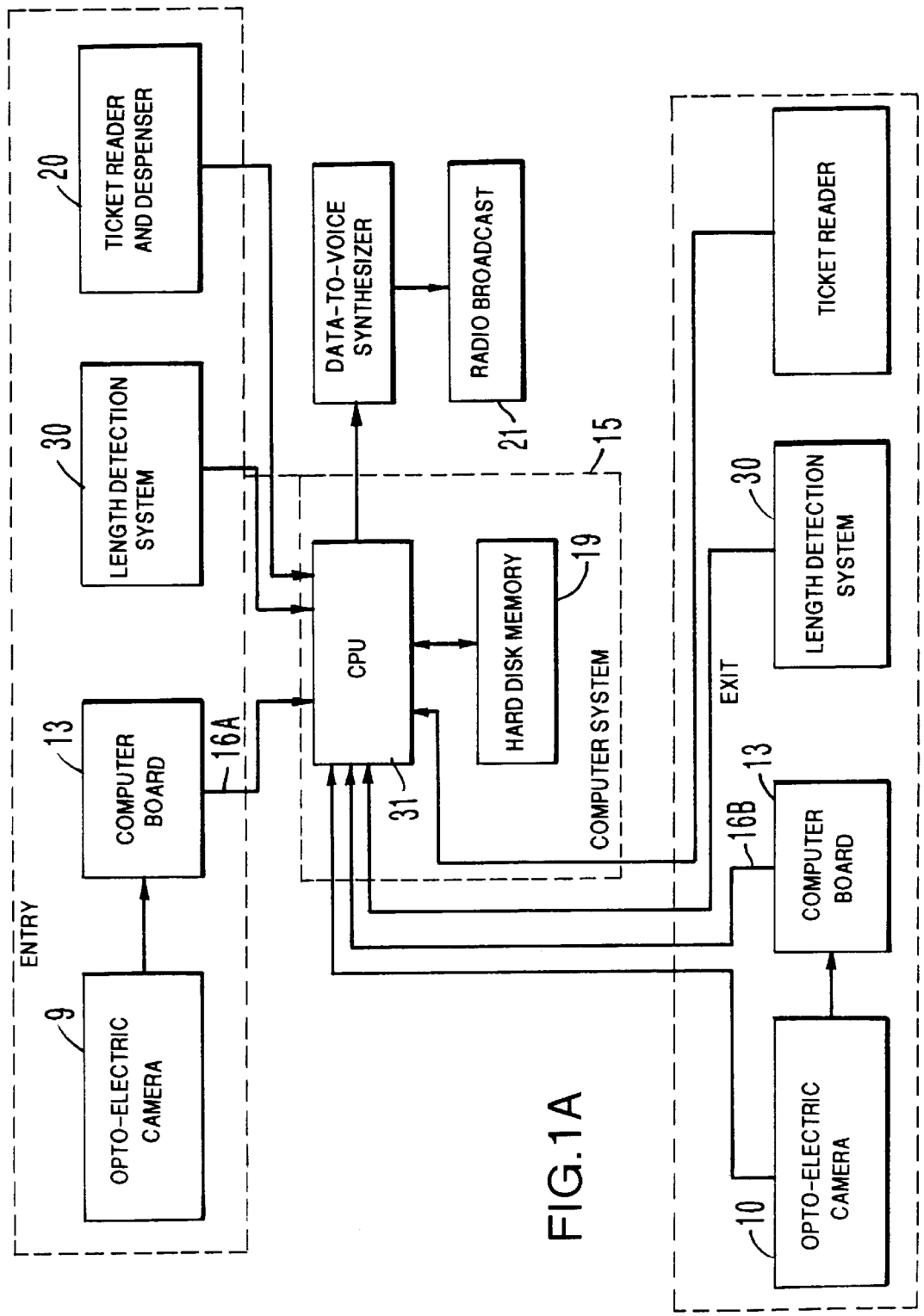
FIG. 1A is a block schematic diagram and FIG. 1B is a flow diagram of the preferred embodiment of the present invention.
Figure 1B:
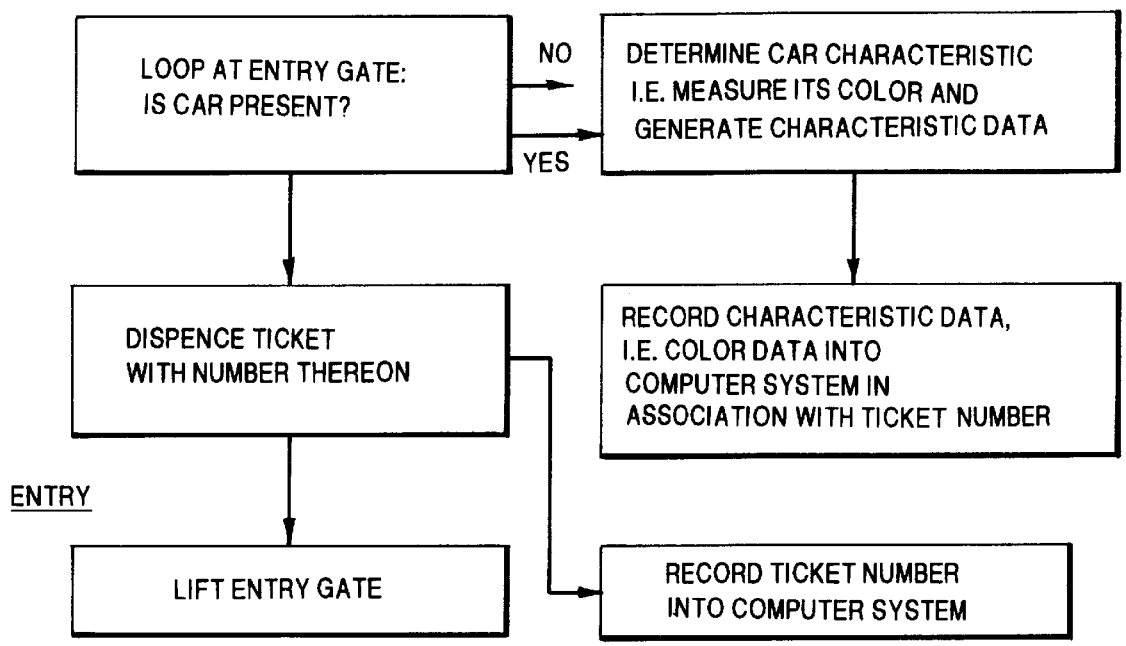
Figure 1B:
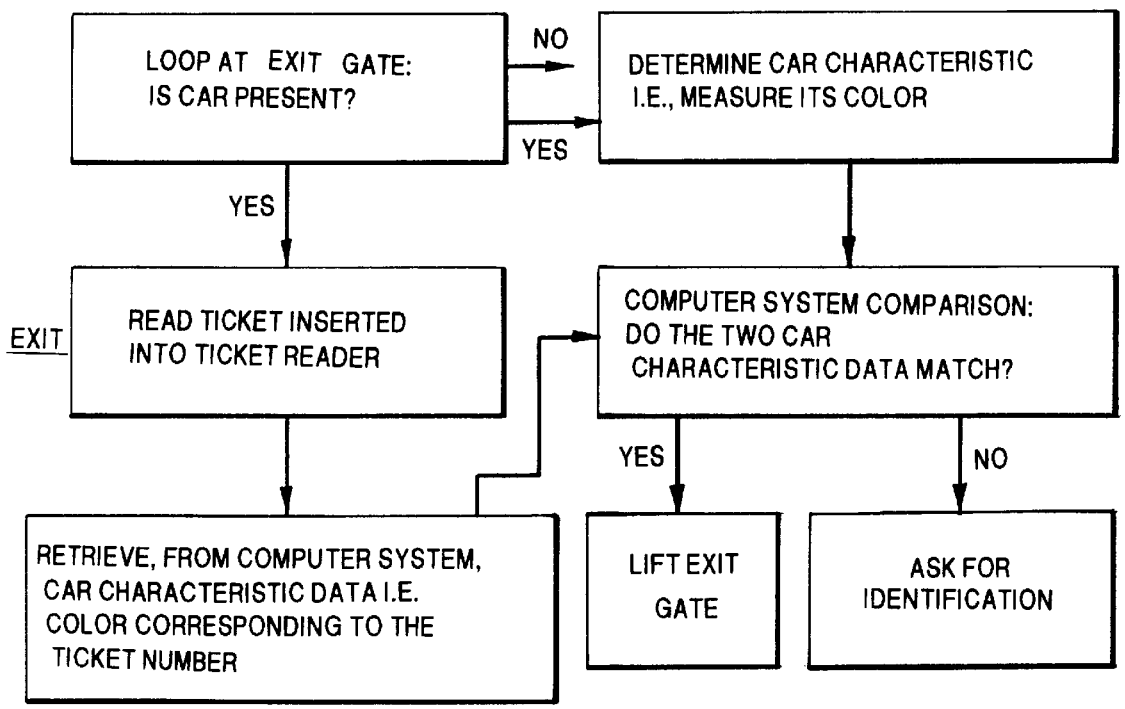

As shown in FIGS. 1 and 2, the system of the present invention includes a first and a second optoelectric video camera 9 and 10 to read the alphanumerics on vehicle license plates. The cameras 9 and 10 are mounted on support structures 11A and 11B above the entry and exit roadways 12A and 12B to a parking area, although alternatively they may be mounted on a post on the side of the roadways. Camera 9 is positioned to read the license plate on the back of the target car at the entrance, and camera 10 is positioned to read the license plate on the back of the target car as it exits the parking area. For additional security, four cameras may be used on a single lane entry and single lane exit to read both the front and rear license plates, in those states requiring both front and back plates.

The camera systems 9 and 10 take an image of the license plate and then convert the image of license plate numbers into a conventional ASCII digital code. A preferred camera is being developed by Vision Applications Inc. (Allston, Mass.). That camera is utilized in U.S. Pat. Nos. 5,175,617 and 5,204,573. It produces a logmap image from a space-vibrant sensor. The camera is preferably a CCD image sensor (Charge Coupled Device) having 192×165 pixels (31,680 total) with a lens assembly of under 0.5 ounce, the image sensor being mounted on a spherical pointer motor.

The camera systems 9 and 10 read the license plates of all the vehicles passing within their area. Each camera 9 and 10 is electrically connected to a specialized computer processor board 13 which converts the alphanumerics of the license plates of vehicles to a digital ASCII code which is transmitted as data streams 16A from camera 9 and 16B from camera 10 to computer system 15. Each camera and its processor board constitute a "camera system"; although with storage of image frames a single processor board 13 may be used for both cameras 9 and 10. That conversion uses algorithms and template matching techniques used in character recognition systems. The license plate characters, in one jurisdiction (state), would be of only one font, making their conversion to digital signals relatively simple. Preferably the computer processor boards 13 are physically mounted on the same support structures 11A and 11B as the cameras 9 and 10. However, a single computer processor board 13, with a suitable time-sharing buffer memory, may be used for a plurality of 2–4 cameras.

Preferably the driver is issued (dispensed) a ticket at the entry to the parking area. A suitable ticket issue machine 20 is associated with an entry gate so that the driver must pull a ticket from the ticket issue machine in order to lift the entry gate.

A suitable system pre-prints the tickets with a bar code, either in a number sequence or a semi-random or random number sequence. The ticket dispenser reads the number of the ticket it issues, using a bar code reader, and associates that number (in computer system memory) with the physical information (length, color etc.) about the car for which the ticket is issued. A less preferred system is to print the physical information, in bar or other code, on the ticket. If the physical information is printed on the ticket, the tickets may be counterfeited; although the system may be simpler. A suitable car code ticket issuing machine which prints and encodes as the tickets are issued is Series 90-4 (TM) from Parking Products, Inc., Willow Grove, Pa. A suitable ticket issue machine, having a bar code reader (bar code scanner) which can read pre-printed bar code on tickets, is Model SP (TM) of Stanley Parking Systems, Farmington, Conn. 06032. Both Parking Products and Stanley Parking sell suitable electrically operated entry and exit gates and "loop detectors". A vehicle loop detector is a coil of wire embedded in the roadway in front and after a barrier gate to trigger a controller that a car is located above the loop. A loop detects the presence of a car, the ticket issue machine automatically issues a ticket, the driver's removal of the ticket causes the entry barrier gate to raise (open) and the car's passage over the loop after the entry gate causes the gate to be lowered (closed).

In a mall or other free parking area, the ticket would be free. However, in an airport parking area, parking garage or other fee-based parking area, the ticket may be the same ticket which is presently used for revenue parking. Alternatively, the ticket may contain additional printed information. For example, if a presently used fee-based system prints the date and time of entry on the ticket, in bar code or in alphanumerics, the date and time without modification may be used as the ticket's number. That number, along with data representing the selected characteristic of the vehicle, is then associated in computer system memory for later retrieval. In addition, that number is read, preferably by a machine, at the exit. For example, if the ticket is printed in bar code the driver, at the exit, would insert the ticket into a bar code reader.

The tickets are preferably of conventional size, either 2"×4" or 2½"×6" (SP and SPC) and 9-point ticket stock.

A sign at the entry gate reads "Please Take Ticket And Keep It With You—Not In The Car".

An alternative license plate number reader, which is commercially available, is made by Racal Radio Limited, 472 Basingstoke Road, Reading, Berkshire, England. It reads license plates from a recorded video image (digital image grabber) using pattern recognition techniques and neural networks. The neural networks are trained on a large number of sample characters. That system, called "Talon" (TM), recognizes license plates in about 0.25 seconds; reads plates on cars traveling at high speed; data can be locally stored or transmitted via land-line or radio to a remote site; and reads plates directly from a video image using programmable DSP (Digital Signal Processing) hardware. The system includes a camera, lighting, plate recognition unit (PRU) and keyboard. It displays, among other things, a copy of the video image and a rolling list of license plates, the list output being via a standard RS 2343 interface.

Real time license plate recognition (LPR) systems are also available from: Gevis GmbH, Innstrasse 16, A-6240 Radfield, Austria (identification time 0.5–0.7 seconds); Perceptics, Knoxville, Tenn.; Imaging Systems, Burlington, Mass. 01803; and are being developed by Zamir Ltd., 17 Hauman St., P.O. Box 53426, Jerusalem 91533, Israel; and Computer Recognition Systems Ltd., Fishponds Close, Wokingham, Berks RG11 2QA, England.

The following U.S. Patents have issued on various systems relating to license plate recognition (LPR) and are incorporated by reference herein: U.S. Pat. Nos. 5,425,108; 4,787,248; 5,136,658; 5,175,617; 4,817,166; 4,731,854; 5,204,675; 5,204,573.

It is important that the camera system and measuring system detect almost all the cars in its area and that the license plate numbers be read with accuracy. Since the presently available license plate readers operate at no more than 90% accuracy, this presents a problem. A possible solution is based on reading only 3 or 4 alphanumerics and voting. For example, the entry camera 9 makes two readings of the rear plate, those readings being the left 3 alphanumerics and the right 3 alphanumerics. Similarly, the exit camera 10 makes two readings of the rear plate, the left 3 alphanumerics and the right 3 alphanumerics. An acceptable result would be a match between one rear plate reading (left or right) and one corresponding rear plate reading (left or right).

The cameras and computer systems may be arranged in different ways to obtain higher accuracy license plate reading results. Some suitable arrangements are:

One entry camera takes pictures of the front plates and a second entry camera takes pictures of the rear plate. Similarly, the exit cameras and obtain images of the exit target car's rear and front license plates, respectively. All four cameras are connected to a high-speed license plate reader, such as a RACAL, which can analyze a plate in 250 ms (milliseconds). Each camera takes one frame for analysis, for a total of 4 frames, which are analyzed by the computer in sequence, for 1 second total of analysis. The four results are compared. An acceptable reading consists of one match from the entry and exit cameras.

A false positive (incorrect plate reading) is highly unlikely if one assumes that the reading errors are random. In theory, assuming that the 10% error on each reading is random, at least 98% of the plates would be read and almost no accepted results would be incorrect.

The computer system preferably has its own data base. For example, using a conventional hard disk (Winchester drive), 10,000 license plate numbers and their associated information (length, width, color, owner's name, etc.)., about 100 bytes per plate, is a data base of only 1 million bytes (1 megabyte). These may be stored in a writable magnetic disk having under 20 ms retrieval time. New license plate information may be added at any time using a keyboard or over a communication line.

Presently suitable computer systems are available from Stanley Parking ("facility management computer system") and Parking Products (TPC-300) as well as PCs (Personal Computers) from IBM and others.

The system does not require a computer system to keep track of ticket numbers if a car's identification is printed on the ticket. However, this system, although relatively simple, is subject to the counterfeiting of tickets. In this system the car's license plate and physical data (length, color, etc.) are printed on the ticket, in bar code or other code, by the ticket issue machine. That ticket is read, at the exit, by a ticket reading machine. A simple computer system at the exit attempts to match the data read from a ticket with the data obtained by the sensor at the exit gate.

Even if by chance the thief has stolen a car and used the registered plates of a car of the same length, or close to that length, if the detected color does not match the registered color the plate is likely to be a switched plate.

With this system mistakes may occur, for example, because a car is carrying an object which protrudes from its trunk, increasing its apparent length.

The preferred car length measuring system uses, at each of the entrance and exit, a first laser rangefinder whose laser beam is directed at the front of the car and a second laser rangefinder whose laser beam is directed at the back of the car The distance from each of the rangefinders to the car is obtained and a computer system calculates the length of the car from those measurements.

The preferred rangefinder is a laser (Light Amplification by Stimulated Emission of Radiation) rangefinder which uses an intense, directional (narrow), coherent, monochromatic beam generated by a semiconductor (or diode) laser in the infrared or visible (red) range. The distance is measured by the time it takes a pulse (pulse burst) of the laser beam to the car (target) and back. The distance is sufficiently short, less than 20 feet, so the car will reflect the laser beam back to the laser photoresponsive detector proximate the laser.

In a more sophisticated system a third laser rangefinder measures the distance from the ticket machine to the car. Generally that distance would vary, at most, about four feet, the length of an arm. The two rangefinders are then controlled to pivot to pick out points on the car, for example, one foot, beyond that distance. This will ensure that the laser beams at the entrance and exit are reflected from the same points on the car, to avoid problems due to the curve of the bumpers or sheet metal. Preferably the laser beams are directed at the car's bumpers, which are at the same height for most cars.

Figure 4:
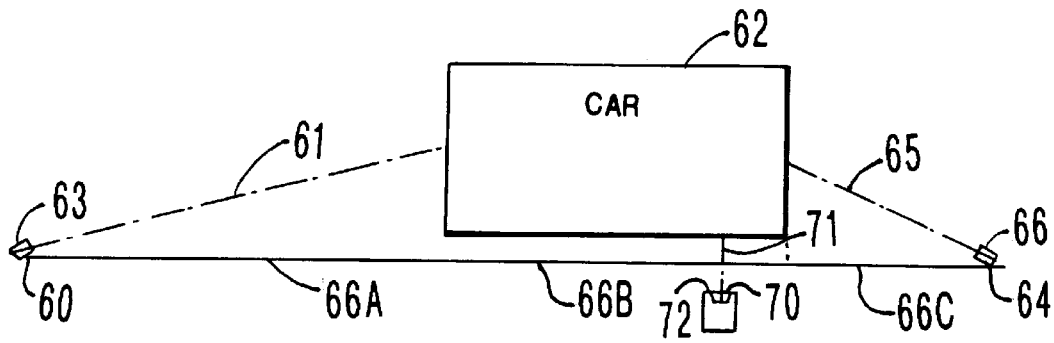
FIG. 4 is a schematic diagram of the first embodiment of the car length measurement system of the present invention.

FIG. 4 shows a laser rangefinder system to measure car lengths. One such system is preferably used at the entrance, i.e., entry barrier gate, and a second system, of the same type, is preferably used at the exit, i.e., exit barrier gate. A laser 60 produces a laser beam 61 which is directed at the back bumper of a car 62. A portion of the beam is reflected and returns to be sensed by photodetector (laser detector) 63. Similarly a second laser 64 produces beam 65 which is reflected by the front bumper of car 62 and is sensed by photodetector 66. The imaginary line 66 between lasers 60 and 64 forms two imaginary right angle triangles. The laser photodetectors 63,66 are connected to a computer system which uses appropriate trigonometric formulae (or a look-up table) to compute the line segments 66A and 66C. The line segment 66B is computed from length of 66−(66A+66C)=66B, where 66B is the measured length of the car.

A more sophisticated system uses a third laser rangefinder 70, having beam 71 and photodetector 72, which measures the distance between the ticket machine, or other fixed point, and the side of the car. The lasers 60 and 64 are mounted on pivotable tables and are pivoted so that their beams strike the car at almost the same points at the entry and exit, to avoid any errors arising from the curvature of the car body or bumper.

A suitable pulsed time-of-flight laser rangefinder in the HAWK (TM) is available from Schwartz Electro-Optics, Orlando, Fla. 32804. It provides a digital output and has a ranging capability of 10–80 feet with plus-minus 1-inch accuracy and, for the present application with a range of 10–20 feet, may have an accuracy of plus-minus 0.5 inches. An alternative laser rangefinder, which is slower but less expensive, is Model C5148 and daylight point finder Model C53149 from Edmund Scientific, Barrington, N.J. 08007.

A less expensive system may be envisioned using only a single rangefinder. For example, a single rangefinder 60 sends its beam 61, for $1/10$ second, and then a mirror is interposed to send the beam from rangefinder 60 along line 66. A mirror, at the position of rangefinder laser 64, replaces rangefinder laser 64 and directs the beam 65 to hit the front of the car for $1/10$ second. In this way the distances of beams 61 and 65 are measured using a single laser rangefinder. If desired, the path of line 66 can be enclosed in a pipe or tube to prevent blockage of the beam long line 66.

A single laser may be used for the entry and exit if the entry and exit are next to each other. The same laser rangefinder may be pivoted to direct its beam either right— as seen from above—for entry, or left, for exit. A pivotable mirror, at the location of laser 64, may be used to direct the left beam 65 and a corresponding right beam, at different times.

Inexpensive range finders ($200–$400) for hunters are made by Bushnell (Lytespeed-TM) and Brunton (Laser 70) and may be adapted for this purpose, although with a loss of accuracy compared with a more expensive system. If the system is less accurate, for example, 1-inch plus-minus at entry and exit lasers, then cars which are within a 4-inch band in length would pass the length measuring matching procedure. A stolen car, on a random basis, may have abut a 3–5% chance of not being detected with a less accurate system.

Figure 3A:
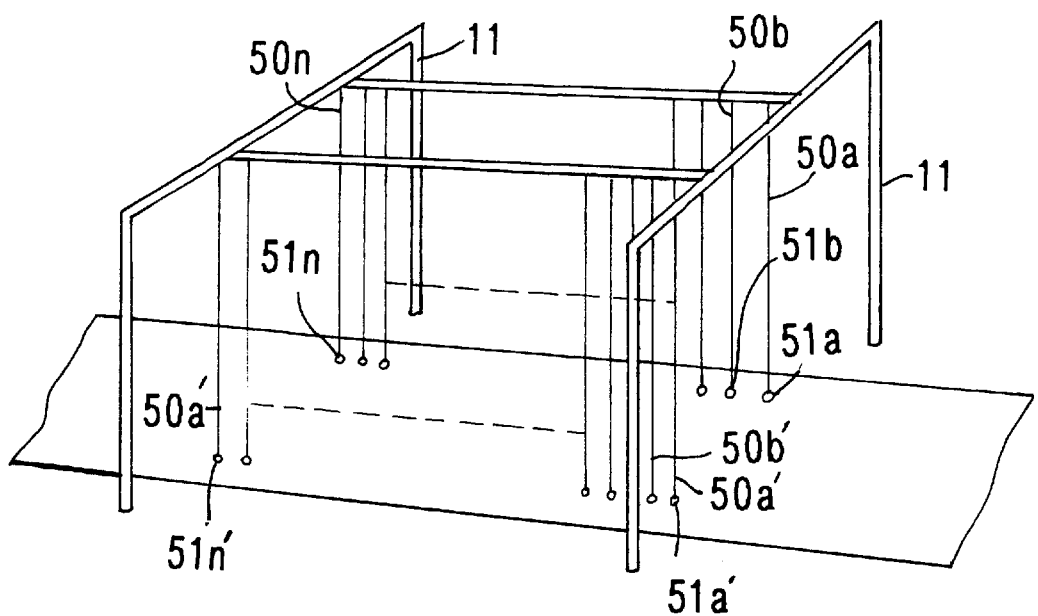
FIGS. 3A and 3B are perspective views of another embodiment of a car length measuring system and of a car width measuring system, respectively.

The less preferred system for measuring car lengths is the direct measurement system shown in FIG. 3A. This system is particularly useful when cars are moving slowly or are fully halted, for example, an entry or exit gate. In this system a series of light beams 50*a*–50*n* (where n is from 50 to 250), preferably laser beams or infra-red beams, are aligned in a line along the direction of traffic and in the center of a traffic lane. Preferably the beams are spaced 1 inch apart (2.54 cm) and there are at least 50 beams and preferably 250 beams. A car will break (interrupt) the number of beams according to its length. For example, a 120-inch (304.8 cm) car will interrupt 120 beams, spaced 1 inch apart (2.54 cm). Each beam has a reflector 51*a*–51*n* also spaced 1 inch (2.54 cm) apart, aligned in a row and fixed beneath the beam generators on the roadway. The reflectors 51*a*–51*n* each reflect a beam back to a photoresponsive transducer. Preferably also second lines of beams 50*a'*–50*n'* and reflectors 51*a'*–51*n'* are used, spaced about 3 feet from beams 50*a'*–50*n'* and parallel thereto. Alternatively, instead of using reflectors, the line of photoresponsive transducers (photodetectors) may be located on the roadway and a single laser, or infra-red generator, may be positioned overhead which sweeps its beam rapidly, i.e., $1/100$ second, back and forth over the line of photodetectors. This system of direct measurement of car length does not require any measurement of speed.

Figure 2A:
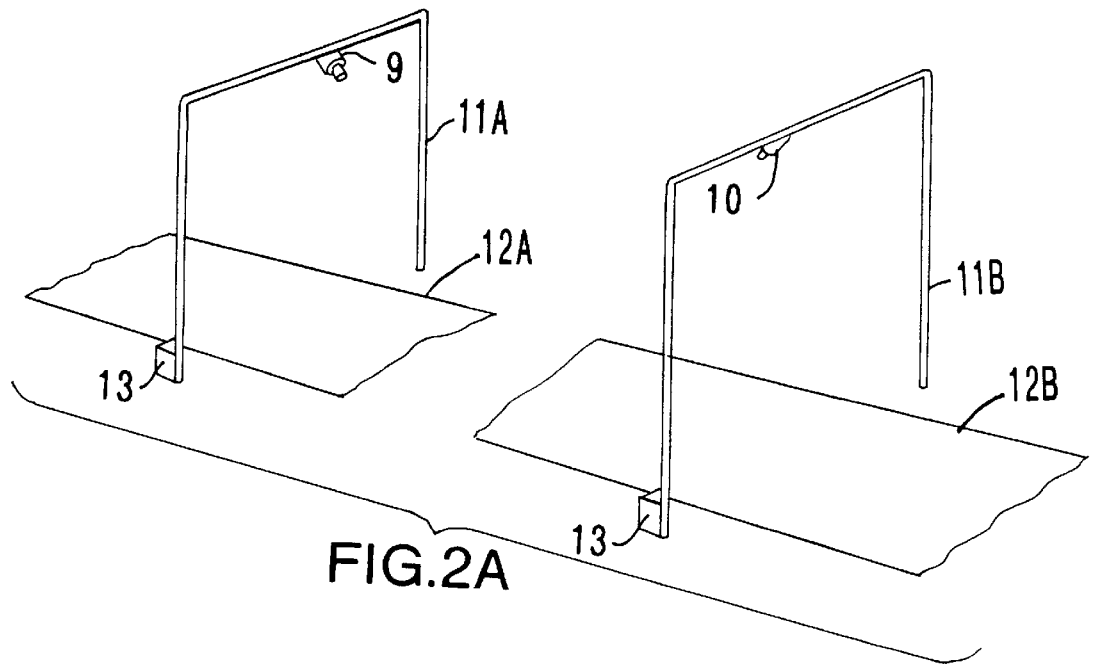
FIGS. 2A and 2B are perspective views of mounting systems for the video cameras and for the double light beam system, which is an embodiment of a car length measurement system.

This system of direct measurement using multi-photodetectors is preferably also used to measure the width of cars. This width measurement system is also preferably used with the double-beam system of FIGS. 2A and 2B, and the multi-beam system of FIG. 3A, to provide car width information. As shown in FIG. 3B a line of light beams 53*a*–53*n*, one inch apart (2.54 cm), at least 20 beams and preferably 200 beams, and reflectors 54*a*–54*n* on the roadway are aligned perpendicular to the flow of traffic, i.e., across a traffic lane. For example, if 60 beams are interrupted the width of the car is 60 inches (152.54 cm).

Figure 2B:
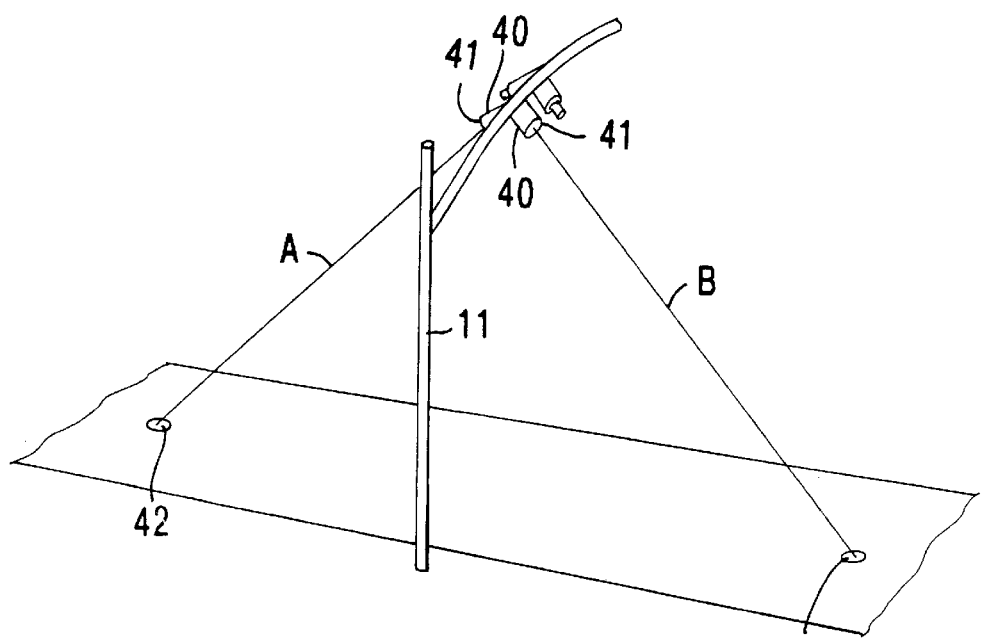
Figure 3B:
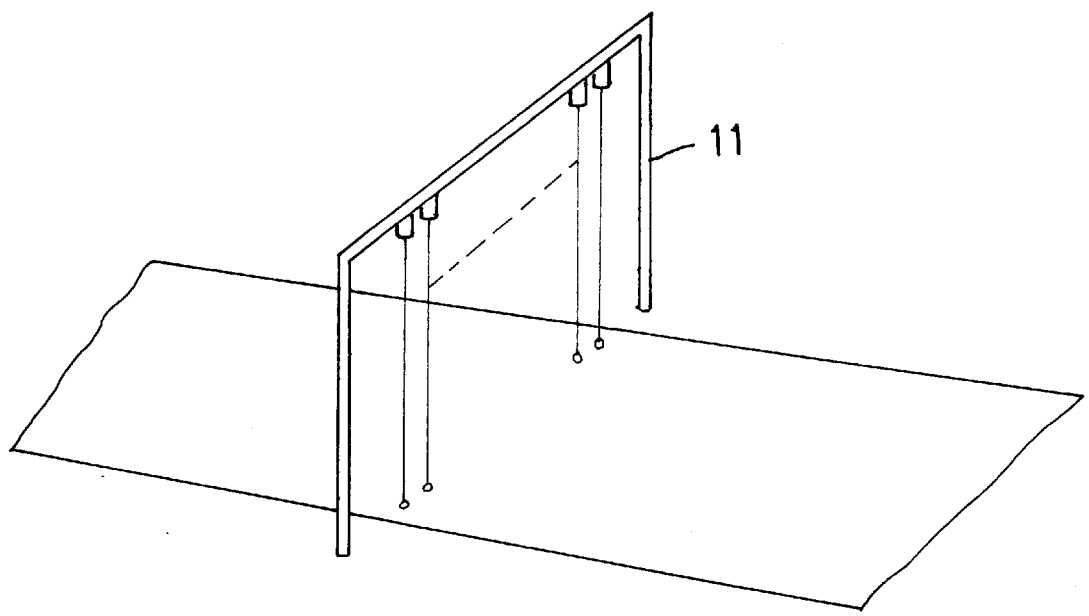

Another method of obtaining the length of the car is to use two light beams A and B, FIG. 2B. Each beam is directed at opposite ends of a space which becomes occupied by a moving car, i.e., each beam, in sequence, is broken by the car. If the two beams are A and B, as shown in FIG. 2B, the front of the car will break (interrupt) beam A and then break beam B. Each beam acts as a switch which is "on" (unbroken) or "off" (broken by the presence of a car).

The distance between beams A and B is exactly determined and known. Preferably it is somewhat longer than the longest vehicle sought to be detected. For example, the space between beams A and B is set at exactly 22 feet (FIG. 2A) (9.6096 meters). The time it takes the front of the car to first break beam A and then break beam B is measured by the speed of the car. A car traveling at 60 mph (miles per hour) (96.3 km. per hour) travels at 88 feet/sec or 1056 inches/sec (2682.24 cm/sec) and the time from beam A to beam B is 0.947 milliseconds. Once the speed of the car is derived, its length may readily be automatically computed, using the timing information from the "on" and "off" of beams A and B.

Preferably the speed is determined from the average speed of the front and back of the car, as the car may be accelerating or decelerating between beams A and B. The speed of the front of the car is the time from beam A being off to the time beam B is off. The speed of the back of the car is the time beam A goes from off to on to the time beam B goes from off to on. Those two speeds are averaged to arrive at "average speed".

At any one average speed, the longer the time period the beams A and B are off, the longer is the length of the car.

The length of the car is preferably the time beam A is off averaged with the time beam B is off, i.e., "average time beam interrupted". The formula to determine car length is as follows:

$$\text{car length} = \frac{\text{average time beam interrupted}}{\text{average speed}}$$

At 60 mph the difference between a 100-inch long and a 101-inch long car is 0.95 ms. The computation may use the formula, as above, or may use a look-up table stored in computer memory. The look-up table preferably has mph from 1 to 120 and average times corresponding to lengths from 80 to 250 inches.

The beams A and B each may consist of three, or more, separated beams. The purpose of these multi-beams is to insure that cars are detected although they are not in the center of the lane and to insure operation in the event one beam is disabled. Preferably the beams are separated sideways (perpendicular to the direction of traffic) by about 2 feet (0.9144 meters). The shortest length measured by the separated beams is taken as the measured length, as the longer measures may occur because of spare tires on the back of some vehicles or items protruding from their trunks. In operation, preferably the first of the beams, A1, A2 and A3, and then B1, B2 and B3, which is interrupted, is taken as the signal source and the other output signals are not used.

Preferably the beams are laser beams from lasers 40 mounted on an overhead structure of the type shown in FIG. 2A. An alternative mounting from a light fixture or stop light is shown in FIG. 2B. In this alternative the lengths of various models should be obtained by experimentation. The beams are reflected back, from reflectors 41 fixed on the roadway, and detected by photoresponsive transducers 42 (photodiodes or phototransistors) next to the lasers on the overhead structure. To avoid the adverse effects of sunlight, headlights, etc., each laser may be pulsed with a distinctive digital pattern or code so that amplitude effects may be lessened. Alternatively, infra-red beams may be used, which would also preferably be pulsed with a suitable pattern or code. If the target vehicle is accelerating or decelerating, the speed may be too uncertain and the length measurement distorted. Consequently, it is preferred that if the speeds as measured by beams A and B differ by more than 2 mph (3.22 km/hr) the data as to that vehicle not be used.

It is optional to identify a second and third physical characteristic of the target vehicle. For example, if the primary physical characteristic is length, the second physical characteristic may be width and/or color. Alternatively, for a simple and inexpensive system, only the car's color need be measured. A system to detect color preferably uses a color luminance meter and a timed Xenon flashing light to illuminate the car's area whose color is to be measured. For example, a light beam is shined on the car's side and its reflection is viewed by a color luminance meter having three photoresponsive transducers (photodiodes or phototransistors). A suitable color filter, for example, standard narrow band optical red, green and blue filters, such as Green No. 342C, Red No. 185C and Blue No. 280C, is mounted in front of each photoresponsive transducer to indicate if the car is, for example, blue, green, red black, white, etc.

A preferred color luminance meter system would use a light beam to illuminate a spot on the car's side, hood or roof and a luminance meter which subtends a 1.0 degree cone. The color data is generated in chromaticity x, y and z coordinates and may produce at 256 digital color indications, each being a mix of x, y and z coordinates. For example, an acceptable range (band) which is considered a match of the colors of the target car would be ±5% of each of the x and y coordinates. As an example, on a scale of 0 to 1 for each of the x and y coordinates, if the measurement of the target car at the entry is x=0.10, y–0.16 there is a match. But if the measurements of the chromaticity of the car's paint at the exit are x=0.15, y=0.12, there is a mismatch and a warning signal would be generated. A suitable color luminance meter is the "Chroma" TM from Minolta, and a less expensive alternative is a color illuminance meter, such as the "xy1" TM also from Minolta, which produces a digital ASCI code output.

Even in the event of a snowstorm, the optical meter to detect color would not have to be deactivated, if the car's side door is viewed by the color meter.

Figure 5:
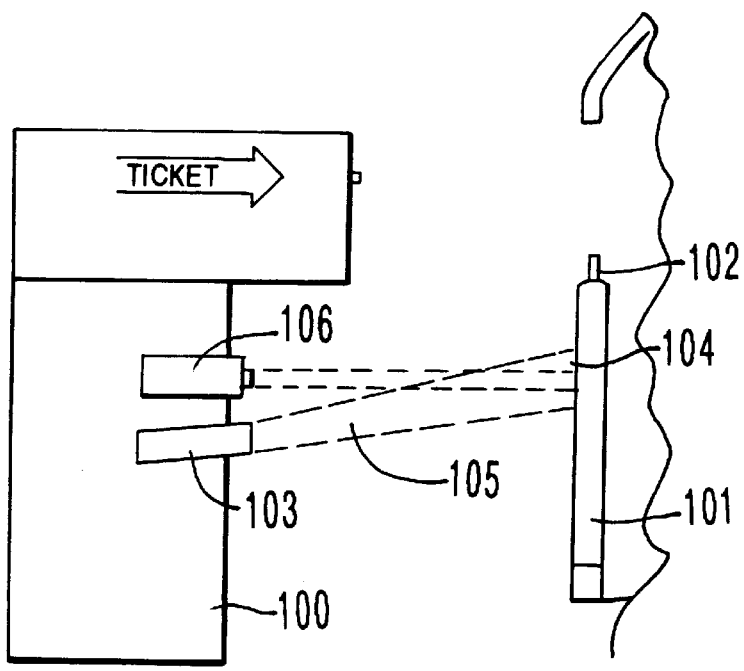
FIG. 5 is a front view of a ticket dispensing machine.

As shown in FIG. 5 a ticket dispenser 100 at the entry area is positioned next to car door 101 whose window 102 is down. A flashable xenon light 103 is mounted on the ticket dispenser and is triggered to flash, for example, by the driver pulling the ticket from dispenser 100, or by a loop detector. The light 103 illuminates an area 104 on the car door 101 with its light beam 105. That area 104 is viewed by color meter 106 which measures the car door's paint color, i.e., determines its (x,y) chromaticity coordinates. Generally the car door 101 will be only 1–3 feet from the color meter 106 (calorimeter) and the car fully stopped, so that a reasonably accurate reading may be made in less than one second when the light is flashed. The flash "on" period extends throughout the color measurement period.

The color measurement system at the exit is the same as is shown in FIG. 5, except the lamp and color meter are mounted on the side of the ticket reader.

In the case of various models the lengths are the same or very close to each other. For example, in 1995 models the Chevrolet Monte Carlo is 200.7 inches (509.8 cm) long and the Chevrolet Lumina is 200.9 inches (510.3 cm) long; the Dodge Intrepid is 201.7 inches (512.3 cm) long; Eagle Vision 201.5 inches (511.8) long and the Chrysler Concord 201.5 inches (511.8 cm) long; the Buick LeSabre is 200.0 inches long (508 cm) long and the Oldsmobile 88 is 200.4 inches (509 cm) long; the Buick Skylark is 189.2 inches (480.6 cm) long and the Oldsmobile Ciera is 190.3 inches (483.4 cm) long.

It is also possible to use a number of processing boards at each camera installation to increase processing speed. For example, if 4 frames (from 2 cameras) are to be analyzed to read license plate numbers, 4 processor boards may be used simultaneously, one for each frame.

In the preferred embodiment set forth above, a physical characteristic, preferably length, is measured for the target vehicle.

The width of the car bodies varies less than their lengths and is less helpful than length distinguishing one car from another. However, car width in some cases is an important guide in distinguishing car models having about the same length. For example, in 1995 car models the following cars are about (with 1 inch plus and minus) 186 inches in length:

| Model | Length | Width |
|---|---|---|
| BMW - 5 Series | 186 | 69 |
| Chevrolet Astro | 187 | 78 |
| Chrysler Cirrus | 186 | 71 |
| Chrysler LeBaron Conv. | 185 | 69 |
| Dodge Avenger | 187 | 69 |
| Dodge Stratus | 186 | 71 |
| GMC Safari | 187 | 78 |
| Honda Odyssey | 187 | 71 |
| Hyundai Sonata | 185 | 70 |
| Mercedes-Benz E-Class | 187 | 69 |

In this example the width helps in the cases of the Chevrolet Astro and GMS Safari; but the other cars in this group have a width in the range of 69–71 inches. Eight models in this group have a length of 185–187 inches and a width of 69–71 inches. So another method must be used to distinguish between the eight models in this group.

A template matching procedure may preferably be based on the following analysis of the two frames of the car's image. One image is of the front of the car and the second image is of the rear. The two images will emphasize the reflection from the glass and/or plastic front and rear light lenses. The size, location and shape of such lenses are often characteristic of a car model. Also, since the edges are known, the camera will center itself along the center.

A car's lenses are generally distinctive and, at night, would preferably be illuminated by a flash of infra-red light. The headlight lenses are (i) symmetric, so only the left headlight lens (or the right) need be imaged and analyzed, and (ii) at the front of the car at a certain height. A picture of the front of the car would show that its headlight lens is located within back about 10 inches from the front of the bumper. Preferably the car's headlight lens is compared to the headlight's lenses of cars of the same length (within 1 or 2 inches plus and minus) so that comparison may be of, at most, 10 headlight lenses. Various pattern recognition and template matching systems may be used, for example, the system of U.S. Pat. No. 5,175,775, incorporated by reference.

Often the car's logo is at its center, either at the front of the hood or on the trunk cover (boot). The logo can be "read" by the same type of program as the license plate character reading program. It is estimated that there are about 200–300 models for a five-year period, each of which may be distinguished primarily by its length and secondarily by its light lenses and logos.

In one embodiment of the present invention a historical record is made at each camera system of all the identifications of cars, by model (length and light lenses), color and license plate and time. For example, if 50,000 cars pass one camera system each day, it will record and retain for 30 days their license plate numbers, models and colors, so that any car may be traced. For example, if a car is stolen and its correct or its switched (false identification) license plate number is known, then the camera systems may be interrogated, for example, over a transmission line, if that plate number is on their record. If so, the camera system reports its own location and the time it viewed that plate number to a central police facility.

At a very busy traffic entry or exit a car may pass each second. 21,600 cars may pass an hour or 250,000 cars a day (reduced traffic at night). If each license plate and related data (time, date, location, etc.) comprises 20 bytes, each camera system would generate 5 million bytes per day.

In regard to color it is preferable that there be only 3–10 categories, for example, red, white and other (black, green, blue, etc.). It may be difficult to detect an exact color because it may rain or snow between the time the car enters the parking area and its exit.

When a match is not found, the license plate number and associated information (car length, model and color) may be broadcast by local radio transmitter 21, mounted on support structure 11, to security or police cars in the area. A suitable broadcast system would entail a two-way digital communication system using microwaves in the 2.5 gigahertz band.

In addition, or alternatively, the information may be transmitted by means of a radio paging network. The parking area security cars would have receivers mounted on their dashboards which would pick up the transmitted information and either display it on a CRT (Cathode Ray Tube), synthesize the data into voice, or print the data. The information about the stolen cars may also be displayed on a CRT situated on the dashboards of police cars.

Preferably the digital data format information is converted to voice information by a conventional data-to-voice synthesizer 20. Alternatively, or in addition, it may be broadcast as a data stream and converted to a print-out by a data to alpha-numeric printer in the police cars.

Although various ways have been described to measure a car's color, length, width and its license plate numbers, other ways are within the scope of the present invention. For example, car length may be measured by two digital still cameras, such as Cascio QV-10 LCD Digital Camera, positioned above the ticket dispenser and ticket reader. The output is formatted with distance markers, on the picture, which correspond to distances on the ground.

Also, the tickets may be magnetic stripe cards, or punched tickets, or other types of coded tickets.

What is claimed is:

1. A method of warning of theft of vehicles from a vehicle parking area having an entrance and an exit, the method comprising:
    (a) at the entrance, automatically machine sensing a characteristic of the vehicle as it enters the parking area;
    (b) machine dispensing a ticket to the driver of a vehicle at the entrance;
    (c) machine recording data representing the obtained characteristic in association with data representing an identification of the dispensed ticket;
    (d) at the exit, machine reading the ticket and retrieving the data representing the vehicle characteristic associated with the ticket;

(e) automatically machine sensing the characteristic of the vehicle at the exit;

(f) automatically, in a computer system, comparing the characteristic sensed in (e) at the exit with the characteristic obtained in (d) derived from reading the ticket; and (g) in the event of a mismatch, generating a warning signal.

2. A method as in claim 1 and, at the entrance, informing the driver to retain the ticket with him while the vehicle is parked in the parking area.

3. A method as in claim 1 wherein the ticket has a printed number thereon and machine reading the printed number and entering the machine read number into computer memory before the ticket is dispensed.

4. A method as in claim 1 and machine recording the obtained characteristic in (c) by printing the ticket with the sensed characteristic before the ticket is dispensed to the driver.

5. A method as in claim 4 and in step (d) machine reading the ticket to obtain the data representing the characteristic printed on the ticket.

6. A method as in claim 1 and numbering the ticket before it is dispensed and machine recording the obtained characteristic in (c) by entering the characteristic into computer system memory of a computer system.

7. A method as in claim 6 wherein numbering the ticket is by entering a time so that a time is at least part of the ticket number.

8. A method as in claim 1 and machine reading the ticket to obtain a ticket identifying number printed thereon and retrieving data representing the characteristic of the vehicle sensed at the entrance from computer system memory based on the read ticket identification number.

9. A method as in claim 1 and printing a number on the ticket before it is dispensed and entering the printed number and the vehicle sensed characteristic into computer system memory in association with each other.

10. A method of warning that vehicles are being stolen from parking areas, comprising:

(a) machine reading a license plate number of a vehicle at an entry area of the parking area using an electro-optical license plate reader;

(b) associating data representing the vehicle license plate number with a ticket;

(c) dispensing the ticket, at the entry area, to the vehicle's occupant;

(d) machine sensing the same license plate number of the vehicle at an exit area of the parking area using an electro-optical license plate reader;

(e) reading the ticket at the exit area;

(f) attempting, in a computer system, to match the vehicle license plate number sensed at the exit area with the data representing the characteristic associated with the ticket; and (g) in the event of a mismatch, generating a warning signal.

11. A method as in claim 10 wherein reading a characteristic, at the entry area and exit area in steps (a) and (d) is performed by a license plate reader which reads at least three alphanumerics of the vehicle's license plate.

12. A method as in claim 11 wherein the entry area has an entry barrier gate and dispensing the ticket activates lifting of the entry barrier gate.

* * * * *

(12) EX PARTE REEXAMINATION CERTIFICATE (7494th)
United States Patent
Gerber

(10) Number: US 5,877,969 C1
(45) Certificate Issued: May 11, 2010

(54) SYSTEM AND METHOD FOR PREVENTING AUTO THEFTS FROM PARKING AREAS

(76) Inventor: Eliot S. Gerber, 9 Frog Rock Rd., Armonk, NY (US) 10504

Reexamination Request:
No. 90/010,200, Jun. 18, 2008

Reexamination Certificate for:
Patent No.: 5,877,969
Issued: Mar. 2, 1999
Appl. No.: 08/797,985
Filed: Feb. 12, 1997

Related U.S. Application Data

(60) Division of application No. 08/607,125, filed on Feb. 26, 1996, now Pat. No. 5,638,302, which is a continuation-in-part of application No. 08/566,145, filed on Dec. 1, 1995, now Pat. No. 5,568,406.

(51) Int. Cl.
*G08G 1/01* (2006.01)

(52) U.S. Cl. .................. 705/13; 116/33; 194/302; 340/933; 702/159; 702/170

(58) Field of Classification Search .............. 116/33; 340/932.2, 933; 702/159, 170; 705/13
See application file for complete search history.

(56) References Cited

U.S. PATENT DOCUMENTS

| | | |
|---|---|---|
| 4,064,501 A | 12/1977 | Yost et al. |
| 4,368,979 A | 1/1983 | Ruell |
| 4,603,390 A | 7/1986 | Mehdipour et al. |
| 4,712,103 A | 12/1987 | Gotanda |
| 4,720,785 A | 1/1988 | Shapiro |
| 4,774,571 A | 9/1988 | Mehdipour et al. |
| 4,821,118 A | 4/1989 | Lafreniere |
| 4,947,353 A | 8/1990 | Quinlan, Jr. |
| 4,984,170 A | 1/1991 | Hirahara |
| 4,991,205 A | 2/1991 | Lemelson |
| 5,003,520 A | 3/1991 | Grieu et al. |
| 5,034,739 A * | 7/1991 | Gruhl ............... 340/932.2 |
| 5,066,950 A | 11/1991 | Schweitzer et al. |
| 5,083,200 A | 1/1992 | Deffontaines |
| 5,088,827 A | 2/1992 | Kyriakis |

(Continued)

FOREIGN PATENT DOCUMENTS

| | | |
|---|---|---|
| EP | 0 367 725 A2 | 5/1990 |
| EP | 0 565 014 A1 | 10/1993 |
| EP | 0582989 | 2/1994 |
| FR | 2 671 888 | 7/1992 |
| GB | 2 160 688 A | 12/1985 |
| GB | 2 273 596 A | 6/1994 |
| JP | H2-110800 | 4/1990 |
| JP | H3-82494 | 8/1991 |
| WO | 92/903804 | 3/1992 |
| WO | 92/09973 | 6/1992 |

(Continued)

OTHER PUBLICATIONS

Weant, et al. "Parking," 1990, pp. 215–239.
Chrest et al. "Parking Structures," Structural Engineering, 1989, pp. 51–75.

(Continued)

*Primary Examiner*—Jimmy G Foster

(57) ABSTRACT

A method and system to prevent auto theft from parking areas, such as airport parking lots, includes a ticket dispenser, at an entry gate, which issues a numbered ticket to each driver. The driver is advised to carry the ticket with him and not to leave it in the car. At the same time the ticket is issued, the a part of its license plate number, is automatically determined and entered into computer memory, in association with the ticket number. At the exit, the ticket is presented by the driver, read by a ticket reader, and its associated license plate data is retrieved from computer memory. Also at the exit, part of the license plate of the car is again automatically obtained and compared with the license plate data retrieved from the computer memory. In the event of a mismatch, a warning signal is generated.

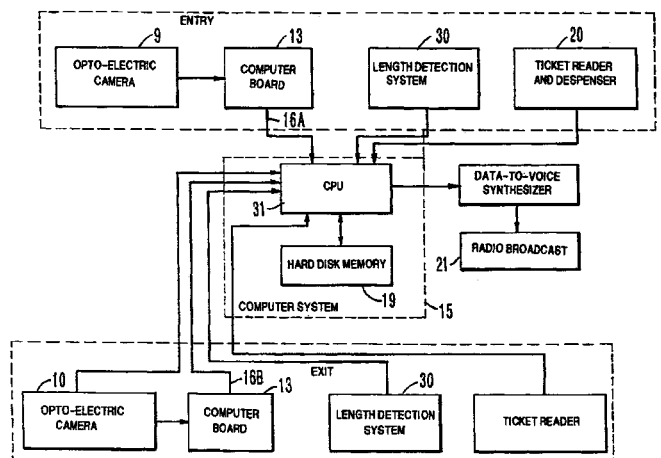

U.S. PATENT DOCUMENTS

| | | | |
|---|---|---|---|
| 5,091,727 | A | 2/1992 | Mahmood |
| 5,095,196 | A | 3/1992 | Miyata |
| 5,124,920 | A | 6/1992 | Tamada et al. |
| 5,175,617 | A | 12/1992 | Wallace et al. |
| 5,206,643 | A | 4/1993 | Eckelt |
| 5,225,665 | A | 7/1993 | Zerfahs et al. |
| 5,283,644 | A | 2/1994 | Maeno |
| 5,381,155 | A | 1/1995 | Gerber |
| 5,422,473 | A | 6/1995 | Kamata |
| 5,548,660 | A | 8/1996 | Lemelson |
| 5,557,254 | A | 9/1996 | Johnson et al. |
| 5,581,630 | A | 12/1996 | Bonneau, Jr. |
| 5,651,075 | A * | 7/1997 | Frazier et al. ............... 382/105 |
| 5,657,389 | A | 8/1997 | Houvener |
| 5,746,052 | A | 5/1998 | Kinugasa et al. |
| 5,748,755 | A | 5/1998 | Johnson et al. |
| 5,812,067 | A | 9/1998 | Bergholz et al. |
| 6,252,978 | B1 | 6/2001 | Grantz |
| 6,374,240 | B1 | 4/2002 | Walker et al. |
| 6,804,378 | B2 | 10/2004 | Rhoads |

FOREIGN PATENT DOCUMENTS

| | | |
|---|---|---|
| WO | 93/01151 | 6/1993 |
| WO | 96/07150 | 6/1995 |
| WO | 96/06409 | 8/1995 |
| WO | 95/25640 | 9/1995 |
| WO | WO 95/29082 | 11/1995 |
| WO | 97/15032 | 12/1995 |

OTHER PUBLICATIONS

Parking News, British Parking Association, Oct. 1994 ed.

Henricks et al., Preliminary Invalidity Contentions of Defendant Dallas–Fort Worth International Airport Board, May 19, 2008 and Exhibit A.

Mizumachi, Identification Number, Carnahan Conference on Security Technology: Electronic Crime Countermeasures.

Kanayama et al., Development of Vehicle–License Number Recognition Systems Using Real–Time Image Processing and Its Application to Travel–Time Measurement, IEEE Vehicular Technology Conference, May 1991.

Hollingum, Automated Fingerprint Analysis Offers Fast Verification, MCB University Press—Sensor Review—The International Journal of Sensing for Industry, Sep. 1991.

Machine Vision Applied to a Speed Violation Detection–Deterrent Systems, Traffic Technology International, 1991.

Blythe et al., Automatic Debiting and Electronic Payment for Transport—The ADEPT Project—1. Overview, Traffic Engineering+Control, Feb. 1994.

Clark et al., Automatic Debiting and Electronic Payment for Transport—The ADEPT Project—3. Congestion Metering: The Cambridge Trial, Traffic Engineering+Control, Apr. 1994.

Beats, Neural Network License Plate Recognition, Traffic Technology International, Summer 1995.

Cattle, The Use of Digital CCTV in an Airport Car–Park Application, IEEE—1995 International Carnahan Conference on Security Technology, Oct. 1995.

Comelli et al., Optical Recognition of Motor Vehicle License Plates, IEEE Transactions on Vehicular Technology, Nov. 1995.

Seki, Travel–Time Measurement & Provision System Using AVI Units, Intelligent Transport Systems World Congress 95, vol. I, Nov. 1995.

Imai, The Parking Lot Management System With Recognizing a License Plate Number Automatically, Intelligent Transport Systems World Congress 95, vol. II, Nov. 1995.

* cited by examiner

US 5,877,969 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–12 are cancelled.

New claims 13–26 are added and determined to be patentable.

13. *A method of warning of theft of vehicles from a vehicle parking area having an entrance and an exit, comprising:*
   *determining the presence of a vehicle at an entry to a vehicle parking area;*
   *taking a first entry image of a license plate of the vehicle using a first entry camera system, wherein the first entry system comprises a camera electrically connected to a computer processing board and the camera is located at said entry to take the first entry image of the front license plate of the vehicle;*
   *determining a plurality of alphanumeric vehicle license plate characters in the first entry image using the computer processing board of the first entry camera system;*
   *taking a second entry image of a license plate of the vehicle using a second entry camera system, wherein the second entry camera system comprises a camera electrically connected to a computer processing board and the camera is located at said entry to take the second entry image of the rear license plate of the vehicle;*
   *determining a plurality of alphanumeric vehicle license plate characters in the second entry image using the computer processing board of the first entry camera system;*
   *converting the plurality of alphanumeric vehicle license plate characters in the first entry image to a first entry set of ASCII codes;*
   *converting the plurality of alphanumeric vehicle license plate characters in the second entry image to a second entry set of ASCII codes;*
   *dispensing a ticket having a ticket number to the driver of the vehicle at said entry to allow the vehicle to enter vehicle parking area;*
   *storing the first entry set of ASCII codes and the second entry set of ASCII codes in association with the ticket number in memory of a computer system;*
   *receiving said ticket at an exit of the vehicle parking area;*
   *machine reading said ticket at said exit to determine the ticket number;*
   *using the ticket number to retrieve the first entry set of ASCII codes and the second entry set of ASCII codes stored in computer memory;*
   *taking a first exit image of the license plate of the vehicle using a first exit camera system, wherein the first exit camera system comprises a camera electrically connected to a computer processing board and is located at said exit to take the first exit image of the front license plate of the vehicle;*
   *determining a plurality of alphanumeric vehicle license plate characters in the first exit image using the computer processing board of the first exit camera system;*
   *taking a second exit image of a license plate of the vehicle using a second exit camera system, wherein the second exit camera system comprises a camera electrically connected to a computer processing board and is located at said exit to take the second exit image of the rear license plate of the vehicle;*
   *determining a plurality of alphanumeric vehicle license plate characters in the second exit image using the computer processing board of the second exit camera system;*
   *converting the plurality of alphanumeric vehicle license plate characters in the first exit image to a first exit set of ASCII codes;*
   *converting the plurality of alphanumeric vehicle license plate characters in the second exit image to a second exit set of ASCII codes;*
   *comparing in a computer system the first entry set of ASCII codes to the first exit set of ASCII codes and comparing in a computer system the second entry set of ASCII codes to the second exit set of ASCII codes;*
   *determining no mismatch when at least one of the comparison of the first entry set of ASCII codes to the first exit set of ASCII codes or the comparison of the second entry set of ASCII codes to the second exit set of ASCII codes is a match; and*
   *generating a warning signal if the comparison results in a mismatch.*

14. *The method of claim 13, wherein the computer processing board of the first entry camera system is co-located with the camera of the first entry camera system.*

15. *The method of claim 13, wherein the computer processing board of the second entry camera system is co-located with the camera of the second entry camera system.*

16. *The method of claim 13, wherein the computer processing board of the first exit camera system is co-located with the camera of the first exit camera system.*

17. *The method of claim 13, wherein the computer processing board of the second exit camera system is co-located with the camera of the second exit camera system.*

18. *The method of claim 13, wherein converting the plurality of alphanumeric vehicle license plate characters in the first entry image to the first entry set of ASCII codes is carried out by the computer processing board of the first entry camera system.*

19. *The method of claim 18, further comprising transmitting the first entry set of ASCII codes from the first entry camera system to the computer system.*

20. *The method of claim 13, wherein converting the plurality of alphanumeric vehicle license plate characters in the second entry image to the second entry set of ASCII codes is carried out by the computer processing board of the second entry camera system.*

21. *The method of claim 20, further comprising transmitting the second entry set of ASCII codes from the second entry camera system to the computer system.*

22. *The method of claim 13, further comprising preventing the raising of a barrier gate at the exit in response to a warning signal.*

23. The method of claim 13, wherein determining the presence of a vehicle at an entry to a vehicle parking area further comprises detecting the presence of a vehicle with a wire embedded in the roadway of the entry to the vehicle parking area.

24. A method of warning of theft of vehicles from a vehicle parking area having an entrance and an exit, comprising:
   determining the presence of a vehicle at an entry to a vehicle parking area;
   taking a first entry image of a first portion of a license plate of the vehicle using a first entry camera system located at said entry, wherein the first entry camera system comprises a camera electrically connected to a computer processing board;
   determining a plurality of alphanumeric vehicle license plate characters in the first entry image using the computer processing board of the first entry camera system;
   converting the plurality of alphanumeric vehicle license plate characters in the first entry image to a first entry set of ASCII codes;
   taking a second entry image of a second portion of the license plate using the first entry camera system;
   determining a plurality of alphanumeric vehicle license plate characters in the second entry image using the computer processing board of the first entry camera system;
   converting the plurality of alphanumeric vehicle license plate characters in the second entry image to a second entry set of ASCII codes;
   dispensing a ticket having a ticket number to the driver of the vehicle at said entry to allow the vehicle to enter the vehicle parking area;
   storing the first entry set of ASCII codes and the second entry set of ASCII codes in association with the ticket number in memory of a computer system;
   receiving said ticket at an exit of the vehicle parking area;
   machine reading said ticket at said exit to determine the ticket number;
   using the ticket number to retrieve the first entry set of ASCII codes stored in computer memory;
   taking a first exit image of the first portion of the license plate of the vehicle using a first exit camera system located at said exit, wherein the first exit camera system comprises a camera electrically connected to a computer processing board;
   determining a plurality of alphanumeric vehicle license plate characters in the first exit image using the computer processing board of the first exit camera system;
   converting the plurality of alphanumeric vehicle license plate characters in the first exit image to a first exit set of ASCII codes;
   taking a second exit image of the second portion of the license plate using the first exit camera system;
   determining a plurality of alphanumeric vehicle license plate characters in the second exit image using the computer processing board of the first exit camera system;
   converting the plurality of alphanumeric vehicle license plate characters in the second exit image to a second exit set of ASCII codes;
   comparing in a computer system the first entry set of ASCII codes retrieved from computer memory to the first exit set of ASCII codes and the second entry set of ASCII codes retrieved from computer memory to the second exit set of ASCII codes; and
   generating a warning signal if the comparison results in a mismatch.

25. The method of claim 24, further comprising determining no mismatch when at least one of the comparison of the first entry set of ASCII codes and the first exit set of ASCII codes or the comparison of the second entry set of ASCII codes and the second exit set of ASCII codes is a match.

26. A method of warning of theft of vehicles from a vehicle parking area having an entrance and an exit, comprising:
   determining the presence of a vehicle at an entry to a vehicle parking area;
   taking a first entry image of a license plate of the vehicle using a first entry camera system, wherein the first entry camera system comprises a camera electrically connected to a computer processing board and the camera is located at said entry to take the first entry image of the front license plate of the vehicle;
   determining a plurality of alphanumeric vehicle license plate characters in the first entry image using the computer processing board of the first entry camera system;
   taking a second entry image of a license plate of the vehicle using a second entry camera system, wherein the second entry camera system comprises a camera electrically connected to a computer processing board and the camera is located at said entry to take the second entry image of the rear license plate of the vehicle;
   determining a plurality of alphanumeric vehicle license plate characters in the second entry image using the computer processing board of the first entry camera system substantially simultaneously with determining a plurality of alphanumeric vehicle license plate characters in the first entry image;
   converting the plurality of alphanumeric vehicle license plate characters in the first entry image to a first entry set of ASCII codes;
   converting the plurality of alphanumeric vehicle license plate characters in the second entry image to a second entry set of ASCII codes;
   dispensing a ticket having a ticket number to the driver of the vehicle at said entry to allow the vehicle to enter the vehicle parking area;
   storing the first entry set of ASCII codes and the second entry of set of ASCII codes in association with the ticket number in memory of a computer system;
   receiving said ticket at an exit of the vehicle parking area;
   machine reading said ticket at said exit to determine the ticket number;
   using the ticket number to retrieve the first entry set of ASCII codes and the second entry set of ASCII codes stored in computer memory;
   taking a first exit image of the license plate of the vehicle using a first exit camera system, wherein the first exit camera system comprises a camera electrically connected to a computer processing board and is located at said exit to take the first exit image of the front license plate of the vehicle;
   determining a plurality of alphanumeric vehicle license plate characters in the first exit image using the computer processing board of the first exit camera system;
   taking a second exit image of a license plate of the vehicle using a second exit camera system, wherein the second exit camera system comprises a camera electrically connected to a computer processing board and is located at said exit to take the second exit image of the rear license plate of the vehicle;

determining a plurality of alphanumeric vehicle license plate characters in the second exit image using the computer processing board of the second exit camera system;

converting the plurality of alphanumeric vehicle license plate characters in the first exit image to a first exit set of ASCII codes;

converting the plurality of alphanumeric vehicle license plate characters in the second exit image to a second exit set of ASCII codes;

comparing in a computer system the first entry set of ASCII codes to the first exit set of ASCII codes and comparing in a computer system the second entry set of ASCII codes to the second exit set of ASCII codes; and generating a warning signal if the comparison results in a mismatch.

\* \* \* \* \*